(No Model.)

G. L. DARLING.
BICYCLE GEARING.

No. 540,954. Patented June 11, 1895.

Witnesses
Fred Clarke
Arthur Care

Inventor
George L. Darling
by
Ridout & Maybee
Atty's

UNITED STATES PATENT OFFICE.

GEORGE L. DARLING, OF SIMCOE, CANADA.

BICYCLE-GEARING.

SPECIFICATION forming part of Letters Patent No. 540,954, dated June 11, 1895.

Application filed September 18, 1894. Serial No. 523,392. (No model.)

*To all whom it may concern:*

Be it known that I, GEORGE LACY DARLING, watchmaker, of the town of Simcoe, in the county of Norfolk, in the Province of Ontario, Canada, have invented certain new and useful Improvements in Bicycle-Gearing, of which the following is a specification.

The object of my invention is to construct an improved gearing for bicycles, by the use of which increased speed may be attained without a corresponding increase in the power expended, and it consists in the peculiar construction, arrangement and combinations of parts hereinafter more particularly described and then definitely claimed.

Figure 1:
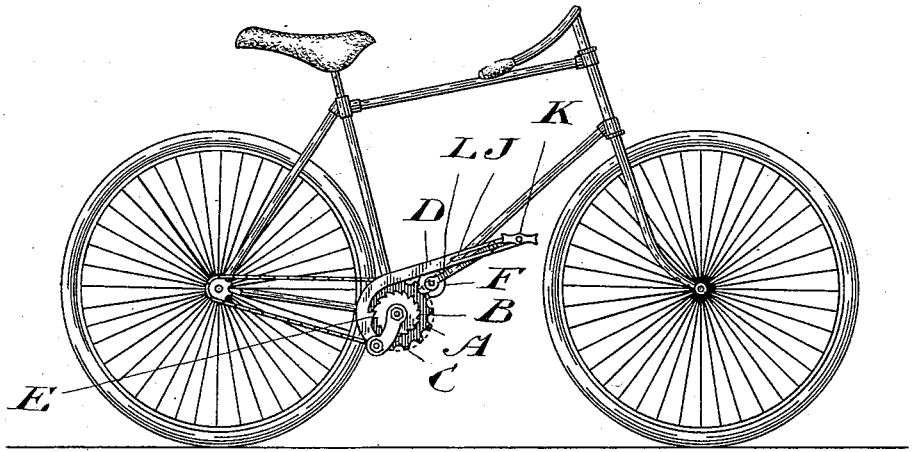
Figures 2, 3:
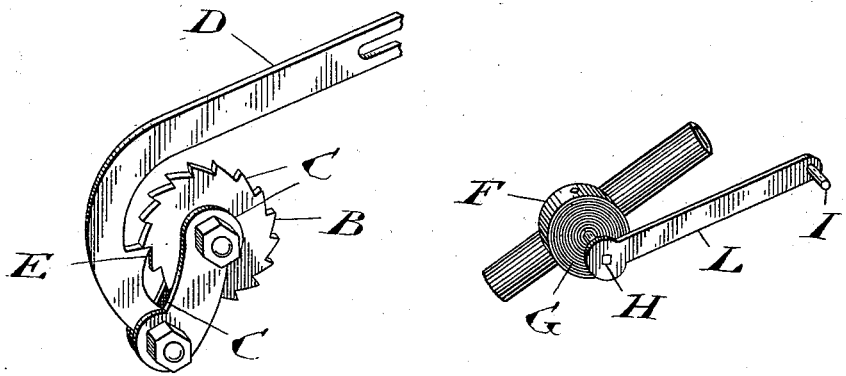

In the accompanying drawings, Figure 1 is a side elevation of a bicycle provided with my improved gearing. Fig. 2 is a perspective detail of a portion of one of the propelling-levers, showing its connection with the driving ratchet-wheel. Fig. 3 is a detail of the spring used to raise the propelling-levers.

In the drawings like letters of reference indicate corresponding parts in the different figures.

A, is the driving sprocket wheel of a bicycle which is carried in the ordinary manner on the frame, the motion from which is conveyed to the rear wheel of the machine by the usual sprocket chain connection. Owing to the increased propelling power obtained by the use of my device, this wheel may be made of greater diameter than usual so that when it is made to revolve once, the bicycle is propelled a distance of twenty-one feet.

B, is a ratchet wheel rigidly connected to the spindle of the sprocket wheel A. C, is a double link loosely pivoted on the said spindle. To the free end of this link the propelling lever D, is pivoted. A lug or tooth E, is formed on this lever, which lug engages with the teeth of the ratchet wheel B, when the outer end of the propelling lever is pressed downward.

F, is a barrel connected to the frame of the machine and containing a clock spring G, to the winding spindle H, of which an arm L, is rigidly connected bearing at its outer end a short pin I, engaging with a slot J, formed in the outer end of the lever D. The tension of the spring G, tends to keep the lever D, in the raised position shown in Fig. 1.

It should be mentioned that many other means might be devised to return the propelling levers to the raised position, and I do not therefore confine myself to the use of the exact means shown.

A pedal K, is connected to the outer end of the propelling lever, and may, if desired, be made adjustable in the slot J.

It will of course be understood that all parts of the driving mechanism are duplicated on the other side of the machine.

Having described the construction of my invention, I will now briefly indicate its method of operation.

When the rider presses downward on the pedal K, the lug E, on the propelling lever D, is forced into connection with the ratchet wheel B, which, by the continuous downward motion of the pedal, is revolved a certain distance dependent on the length of the stroke. When the rider raises his foot, the propelling lever is raised by the action of the spring-actuated arm L. When the lever is so raised, the lug E, is raised clear of the ratchet wheel B, and rides backward without touching it, thereby avoiding undue wear and disagreeable rattle. The rider may, if he so desire, work both pedals simultaneously, or each alternately, as it may suit him best.

By the use of levers, such as mine, the rider is always exerting his power to the fullest advantage and is thus enabled, as I have before mentioned, to use a machine geared up higher than would otherwise be possible. The reciprocating motion is also much more graceful than a rotary, and is specially adapted to the requirements of lady riders.

What I claim as my invention is—

1. In a bicycle, a ratchet wheel revolving with the driving sprocket wheel, a link hung from the spindle or hub of said ratchet wheel, a foot lever pivoted to said link and having a lug engaging with the teeth on said ratchet wheel, and a spring-actuated arm having one of its ends acting on said foot lever, substantially as described.

2. In a bicycle, a ratchet wheel revolving with the driving sprocket wheel and having a link hung from the spindle or hub thereof, a slotted foot lever pivoted in said link and having a lug thereon acting on the ratchet teeth, and a spring-actuated arm having a pin I in one of its ends acting in the slot in said foot lever to return the latter when it is depressed, substantially as described.

Simcoe, September 8, 1894.

GEORGE L. DARLING.

In presence of—
 HUGH P. INNES,
 GEO. W. WELLS.